(12) United States Patent
Watanabe et al.

(10) Patent No.: US 9,595,702 B2
(45) Date of Patent: Mar. 14, 2017

(54) BATTERY MODULE

(71) Applicant: KABUSHIKI KAISHA TOYOTA JIDOSHOKKI, Aichi-ken (JP)

(72) Inventors: Shintaro Watanabe, Kariya (JP); Takahisa Sugimoto, Kariya (JP); Hidefumi Oishi, Kariya (JP); Takashi Sakai, Kariya (JP); Hiromi Ueda, Kariya (JP); Naoto Morisaku, Kariya (JP); Kazuki Maeda, Kariya (JP); Takayuki Kato, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/653,934

(22) PCT Filed: Dec. 13, 2013

(86) PCT No.: PCT/JP2013/083419
§ 371 (c)(1),
(2) Date: Jun. 19, 2015

(87) PCT Pub. No.: WO2014/103746
PCT Pub. Date: Jul. 3, 2014

(65) Prior Publication Data
US 2015/0318520 A1     Nov. 5, 2015

(30) Foreign Application Priority Data

Dec. 26, 2012 (JP) ................................ 2012-282998

(51) Int. Cl.
*H01M 2/10* (2006.01)
*H01M 10/02* (2006.01)
*H01M 10/04* (2006.01)

(52) U.S. Cl.
CPC ....... *H01M 2/1061* (2013.01); *H01M 2/1077* (2013.01); *H01M 10/02* (2013.01);
(Continued)

(58) Field of Classification Search
CPC .. H01M 2/1061; H01M 2/1077; H01M 10/02; H01M 10/0413; H01M 10/0436; H01M 10/0481
See application file for complete search history.

(56) References Cited

U.S. PATENT DOCUMENTS

2008/0299453 A1  12/2008  Shinyashiki et al.
2010/0330412 A1  12/2010  Park
(Continued)

FOREIGN PATENT DOCUMENTS

CN     101315973     12/2008
CN     102308412     1/2012
(Continued)

OTHER PUBLICATIONS

Search report for PCT/JP2013/083419 with English-language translation, having a mailing date of Jan. 28, 2014.
(Continued)

*Primary Examiner* — Jane Rhee
(74) *Attorney, Agent, or Firm* — Greenblum & Bernstein, P.L.C.

(57) ABSTRACT

A battery module is provided with: battery holders, which have accommodation sections; rechargeable batteries arranged side-by-side while being respectively received in the accommodation sections; a metal plate member, which is provided at least between rechargeable batteries adjacent to each other in the direction in which the rechargeable batteries are arranged side-by-side; and a pressure application member, which presses the rechargeable batteries and the plate member in the direction of the side-by-side arrange-
(Continued)

ment. The battery holders respectively have openings into which the plate members are fitted. The plate members are fitted into the openings to protrude from the battery holders in the direction in which the rechargeable batteries are arranged side-by-side.

6 Claims, 4 Drawing Sheets

(52) U.S. Cl.
CPC ... *H01M 10/0413* (2013.01); *H01M 10/0436* (2013.01); *H01M 10/0481* (2013.01)

(56) References Cited

U.S. PATENT DOCUMENTS

| 2011/0023290 | A1 | 2/2011 | Shinyashiki et al. |
| 2012/0156537 | A1 | 6/2012 | Meintschel et al. |
| 2012/0189887 | A1 | 7/2012 | Hohenthanner et al. |
| 2013/0108908 | A1 | 5/2013 | Omura et al. |
| 2014/0356689 | A1 | 12/2014 | Kusaba et al. |

FOREIGN PATENT DOCUMENTS

| CN | 102484221 | 5/2012 |
| JP | 2004-281099 | 10/2004 |
| JP | 2005-259379 | 9/2005 |
| JP | 2008-159439 | 7/2008 |
| JP | 2008-204816 | 9/2008 |
| JP | 2009-81056 | 4/2009 |
| JP | 2012-119156 | 6/2012 |
| JP | 2013/54869 | 3/2013 |
| JP | 2013-93215 | 5/2013 |
| JP | 2013-97888 | 5/2013 |
| WO | 2004/051767 | 6/2004 |
| WO | 2011/012198 | 2/2011 |

OTHER PUBLICATIONS

Written Opinion of the International Searching Authority for PCT/JP2013/083419 having a mailing date of Jan. 28, 2014, along with English-language translation thereof.
International Preliminary Report on Patentability for PCT/JP2013/083419 having a mailing date of Jul. 9, 2015.
Extended European Search Report for EP Pat. App. No. 13866867.8 having an issuance date of Dec. 22, 2015.
Official Action for CN App. No. 201380067824.4 having an issuance date of Dec. 28, 2015.

BATTERY MODULE

TECHNICAL FIELD

The present invention relates to a battery module in which plate members apply pressure to rechargeable batteries.

BACKGROUND ART

Patent Document 1 describes an example of a known battery module that includes rechargeable batteries, which are arranged side by side.

The battery module of Patent Document 1 includes battery cells and plastic battery holders that are alternately arranged. Plastic end plates are arranged at the opposite ends in the arrangement direction of the battery cells. Battery modules are bound in the arrangement direction of the battery cells by a binding band extending in the arrangement direction of the battery cells. Each battery cell is a rechargeable battery that contains electrodes in the case and is capable of being charged and discharged.

PRIOR ART DOCUMENTS

Patent Documents

Patent Document 1: Japanese Laid-Open Patent Publication No. 2008-159439

SUMMARY OF THE INVENTION

Problems that the Invention is to Solve

During charging of a rechargeable battery, supply of electrons into electrodes expands the electrodes. During discharging of a rechargeable battery, release of electrons from electrodes contracts the electrodes. Repeating expansion and contraction caused by repeating charging and discharging of a rechargeable battery may widen the distances between the electrodes or distort the electrodes, which may increase the resistance of the rechargeable battery. Increase in the resistance increases Joule loss. If pressure is applied to the battery module in the arrangement direction of the rechargeable batteries to restrain expansion of the electrodes, the plastic battery holders continuously receive the pressure. This may distort the battery holders. Distortion of the battery holders may reduce the pressure applied in the arrangement direction of the rechargeable batteries, which may hinder proper restraint of expansion of electrodes.

It is an objective of the present invention to provide a battery module that limits reduction in the pressure applied to rechargeable batteries.

Means for Solving the Problems

To achieve the foregoing objective and in accordance with one aspect of the present invention, a battery module is provided that includes a plurality of battery holders, each of which includes an accommodation section, a plurality of rechargeable batteries that is accommodated in the respective accommodation sections and arranged side by side, a metal plate member located at least between ones of the rechargeable batteries that are adjacent to each other in an arrangement direction, and a pressure application member that applies pressure to the rechargeable batteries and the plate member in the arrangement direction of the rechargeable batteries. Each battery holder includes an opening into which the plate member is fitted. The plate member is fitted into the opening such that the plate member protrudes from an associated one of the battery holders in the arrangement direction of the rechargeable batteries.

MODES FOR CARRYING OUT THE INVENTION

One embodiment of the present invention will now be described with reference to FIGS. 1 to 6.

Figure 1:
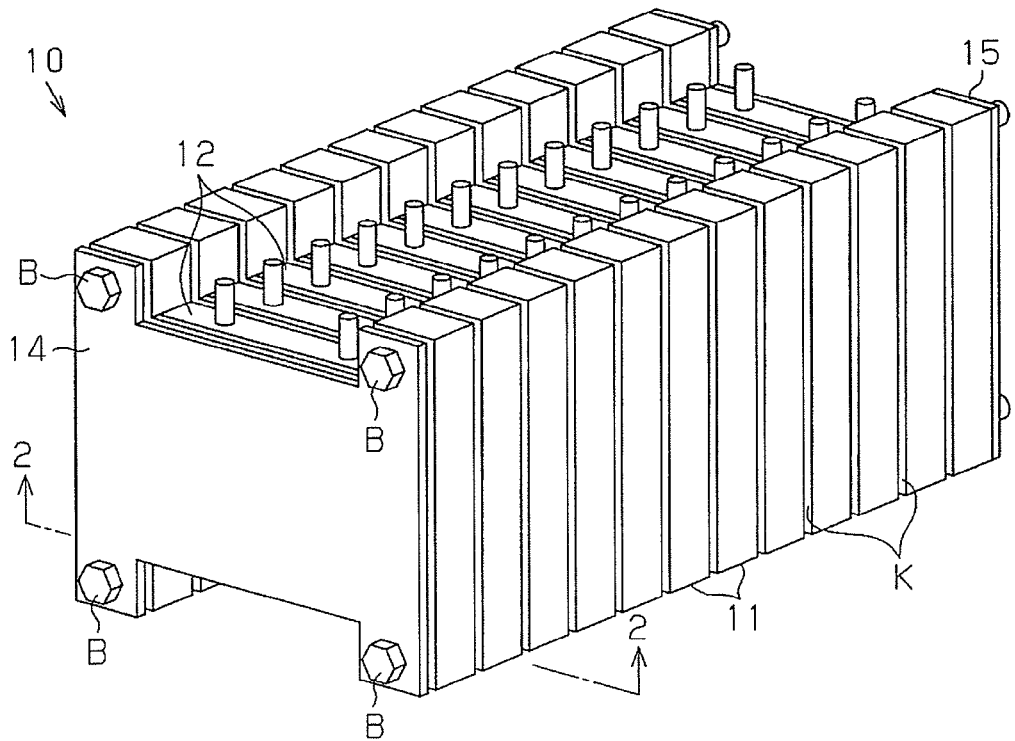
FIG. 1 is a perspective view showing a battery module according to one embodiment.
Figure 2:
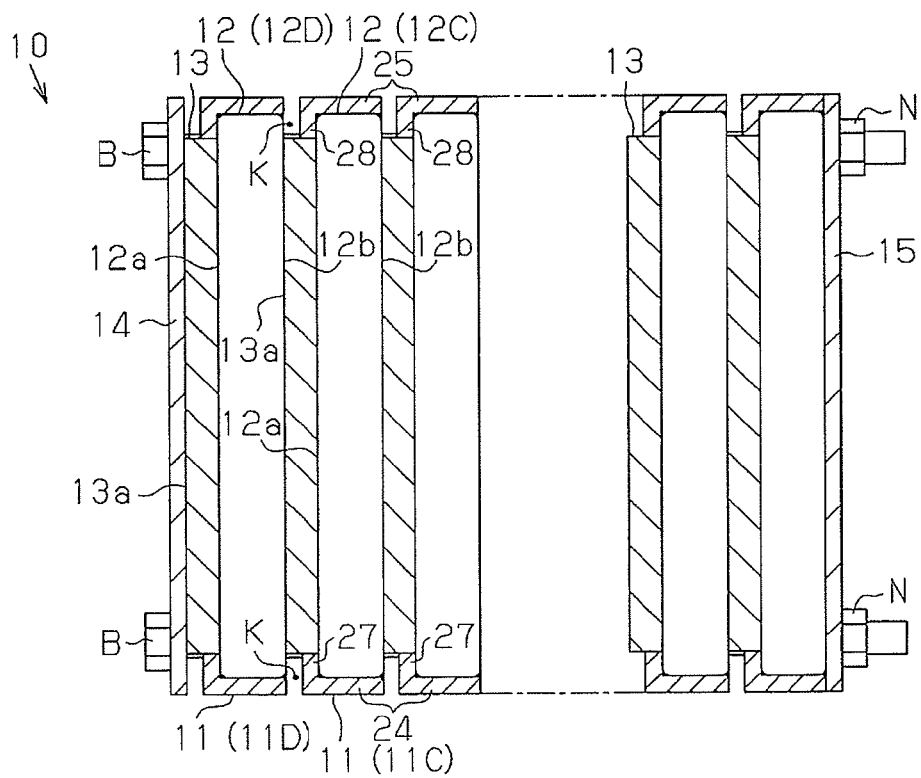
FIG. 2 is a cross-sectional view taken along line 2-2 of FIG. 1.

As shown in FIGS. 1 and 2, a battery module 10 includes rectangular batteries 12, which are rechargeable batteries (such as lithium-ion rechargeable batteries and nickel metal hydride batteries), and plastic battery holders 11, which hold the rectangular batteries 12. The rectangular batteries 12, which are held by the battery holders 11, are arranged side by side in the thickness direction of the rectangular batteries 12. An insulating sheet (not shown) covers each rectangular battery 12. The battery module 10 also includes plate members 13, which have the shape of a rectangular plate and are adjacent to the rectangular batteries 12 in the thickness direction of the rectangular batteries 12. The plate members 13 alternate with the rectangular batteries 12 in the thickness direction of the plate members 13. The plate members 13 are made of metal, such as aluminum or aluminum alloy.

The battery module 10 includes planar metal end plates 14 and 15 arranged at the opposite ends of the battery module 10 in the arrangement direction of the rectangular batteries 12 and the plate members 13. The end plates 14 and 15 sandwich the rectangular batteries 12 and the plate members 13, which are held by the battery holders 11. Bolts B extend through the end plates 14 and 15 and all the battery holders 11 and are threaded to nuts N. Accordingly, the rectangular batteries 12 and the plate members 13, which are held by the battery holders 11, are fixed together with pressure applied to the rectangular batteries 12 and the plate members 13 in the arrangement direction of the rectangular batteries 12. In other words, when the rectangular batteries 12 and the plate members 13 are fixed together, the end plates 14 and 15 press the rectangular batteries 12 and the plate members 13 from the opposite sides in the arrangement direction of the rectangular batteries 12. In the present embodiment, in addition to the plate members 13 arranged between adjacent ones of the rectangular batteries 12, a plate member 13 is located between a rectangular battery 12 and the end plate 14.

Figure 3A:
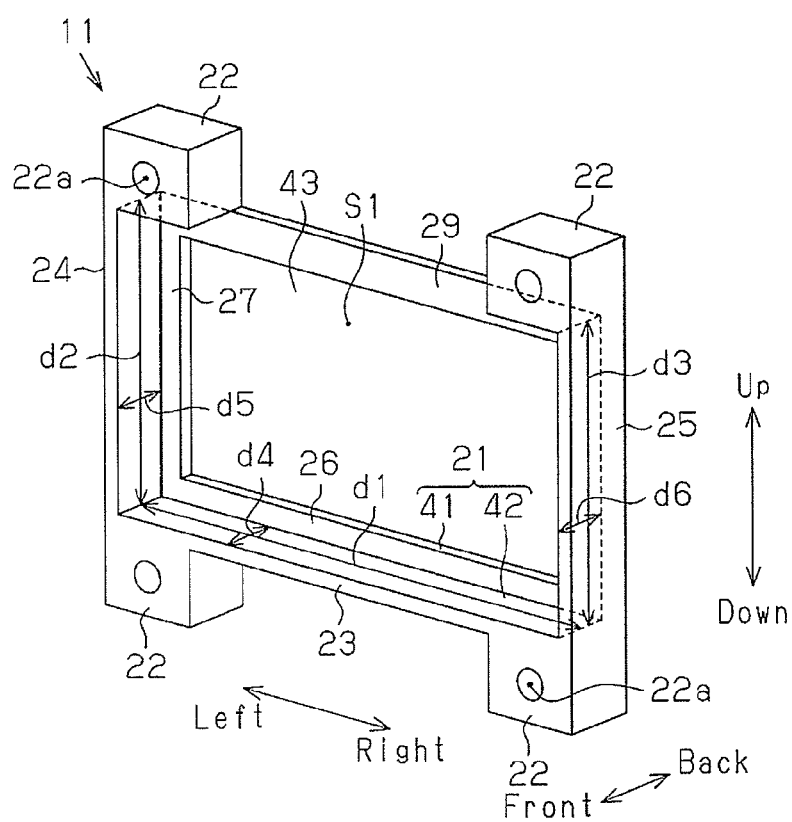
FIGS. 3A and 3B are perspective views showing the battery holder of the battery module shown in FIG. 1.
Figure 3B:
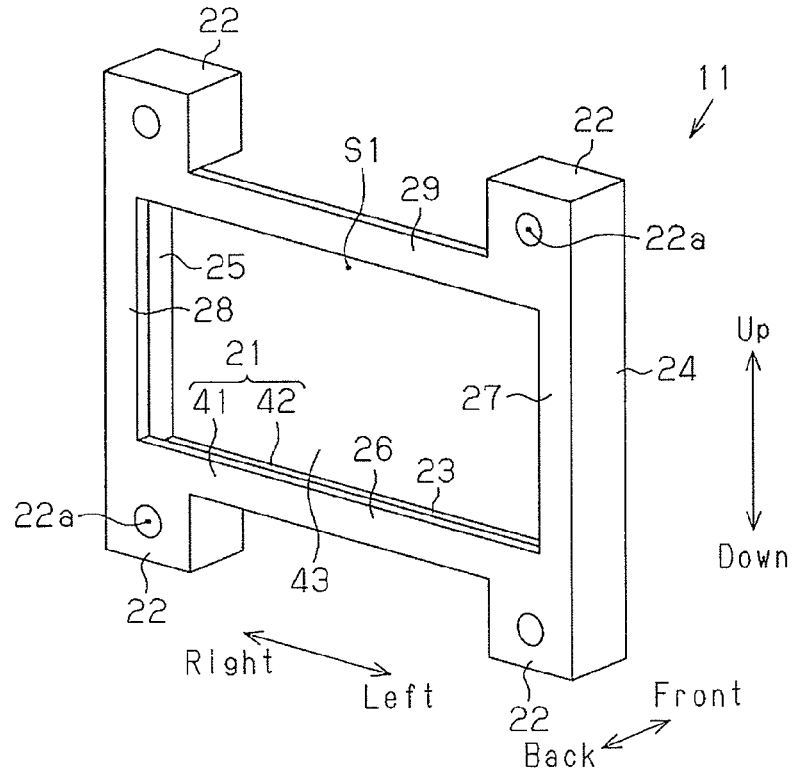

As shown in FIGS. 3A and 3B, each battery holder 11 includes a holder main body 21, which holds a rectangular battery 12 and has the shape of a rectangular frame, and insertion portions 22, which are located at the four corners of the holder main body 21. In the following description, the up-down direction as indicated in the drawings is referred to as the up-down direction of the battery holder 11, and the right-left direction as indicated in the drawings is referred as the right-left direction of the battery holder 11. Further, the direction perpendicular to the up-down direction and the right-left direction of the battery holder 11 is referred to as the front-back direction of the battery holder 11. FIG. 3A has reversed right and left and reversed front and back from FIG. 3b.

The holder main body 21 includes a plate holding section 41, which has the shape of a rectangular frame, and a battery holding section 42, which extends frontward from the front end surface of the plate holding section 41 and substantially has the shape of the letter U that opens upward. The plate holding section 41 includes a lower wall 26, a left wall 27, which extends upward from the left end of the lower wall 26, and a right wall 28, which extends upward from the right end of the lower wall 26, and an upper wall 29, which connects the upper end of the left wall 27 to the upper end of the right wall 28. Each of the walls 26 to 29 has the shape of a rectangular plate. A rectangular opening 43, which receives a plate member 13, is formed in the plate holding section 41. The lower wall 26, the left wall 27, the right wall 28, and the upper wall 29 have the same thickness, which is slightly less than the thickness of the plate members 13. That is, the thickness of the plate members 13 is greater than the thickness of the lower wall 26, the left wall 27, the right wall 28, and the upper wall 29 (the dimension of the lower wall 26, the left wall 27, the right wall 28, and the upper wall 29 in the arrangement direction of the rectangular batteries 12).

The battery holding section 42 will now be described. The battery holding section 42 includes a lower covering section 23, a left covering section 24, and a right covering section 25. The lower covering section 23 extends frontward from the front end surface of the lower wall 26 and extends across the lower wall 26 in the right-left direction. The left covering section 24 extends upward from the left end of the lower covering section 23 along the front end surface of the left wall 27. The right covering section 25 extends upward from the right end of the lower covering section 23 along the front end surface of the right wall 28. Each of the covering sections 23 to 25 has the shape of a rectangular plate. An accommodation section S1, which holds a rectangular battery 12, is formed in the battery holding section 42.

The lower covering section 23 has a dimension d1 in the longitudinal direction (right-left direction) that is slightly greater than the dimension of the rectangular battery 12 in the width direction (the direction perpendicular to the thickness direction and the height direction of the rectangular battery 12). The left covering section 24 has a dimension d2 in the longitudinal direction (up-down direction) that is slightly greater than the dimension of the rectangular battery 12 in the height direction. The right covering section 25 has a dimension d3 in the longitudinal direction (up-down direction) that is slightly greater than the dimension of the rectangular battery 12 in the height direction. The dimensions d4, d5 and d6 in the transverse direction (front-back direction) of the lower covering section 23, the left covering section 24, and the right covering section 25 are substantially equal to the dimension of the rectangular battery 12 in the thickness direction.

The left covering section 24 and the right covering section 25 cover the surfaces of the rectangular battery 12 at the opposite ends in the width direction. The lower covering section 23 covers one of the surfaces of the rectangular battery 12 at the opposite ends in the height direction (i.e., the lower surface).

An insertion portion 22, which has the shape of a rectangular solid, is located under the lower wall 26 and the lower covering section 23 at each of the right and left sides. An insertion portion 22 is located above the upper wall 29 at each of the right and left sides. Each insertion portion 22 includes an insertion hole 22a extending through the insertion portion 22 in the front-back direction. Each insertion hole 22a receives a bolt B.

The right-left direction of the battery holder 11 is the longitudinal direction of the lower covering section 23, the lower wall 26, and the upper wall 29. The up-down direction of the battery holder 11 is the longitudinal direction of the left covering section 24, the left wall 27, the right covering section 25, and the right wall 28. Further, the front-back direction of the battery holder 11 is the transverse direction of the lower covering section 23, the left covering section 24, and the right covering section 25.

Figure 4:
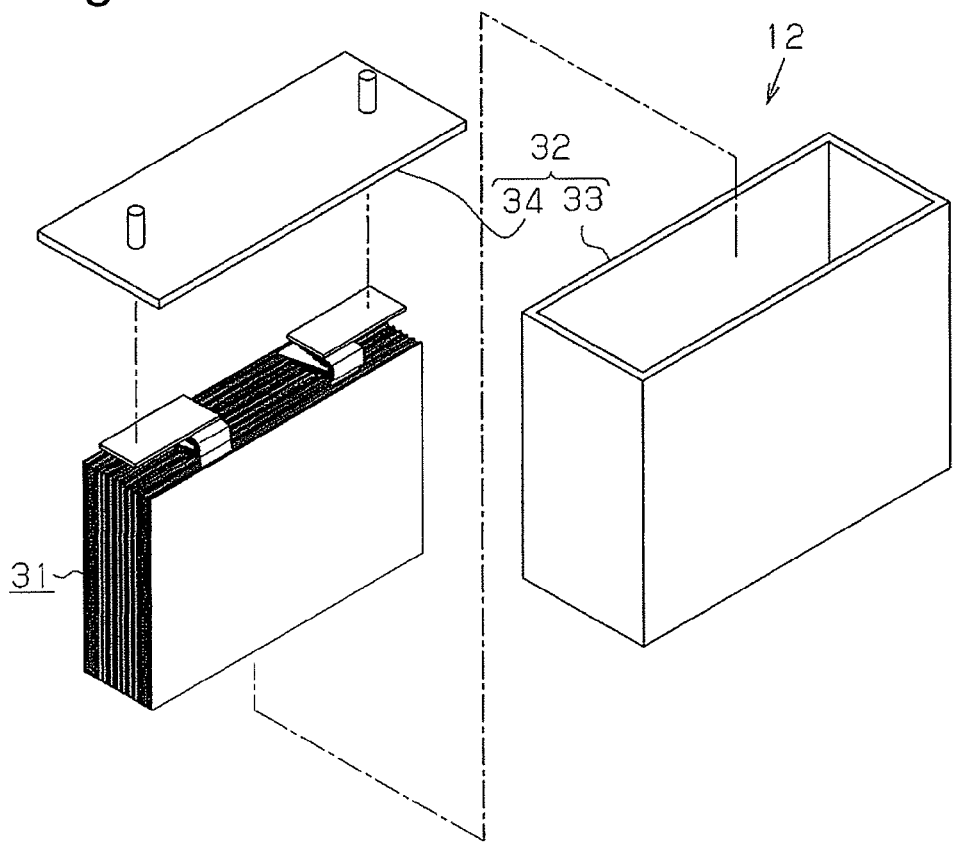
FIG. 4 is an exploded perspective view showing a rectangular battery of the battery module of FIG. 1.

As shown in FIG. 4, each rectangular battery 12 includes an electrode assembly 31 and an aluminum case 32, which accommodates the electrode assembly 31. The case 32 includes a case main body 33, which accommodates the electrode assembly 31, and a lid 34, which closes the opening of the case main body 33. The case main body 33 has the shape of a rectangular box that has a bottom. The lid 34 has the shape of a rectangular plate. The case 32 contains an electrolyte.

Figure 5:
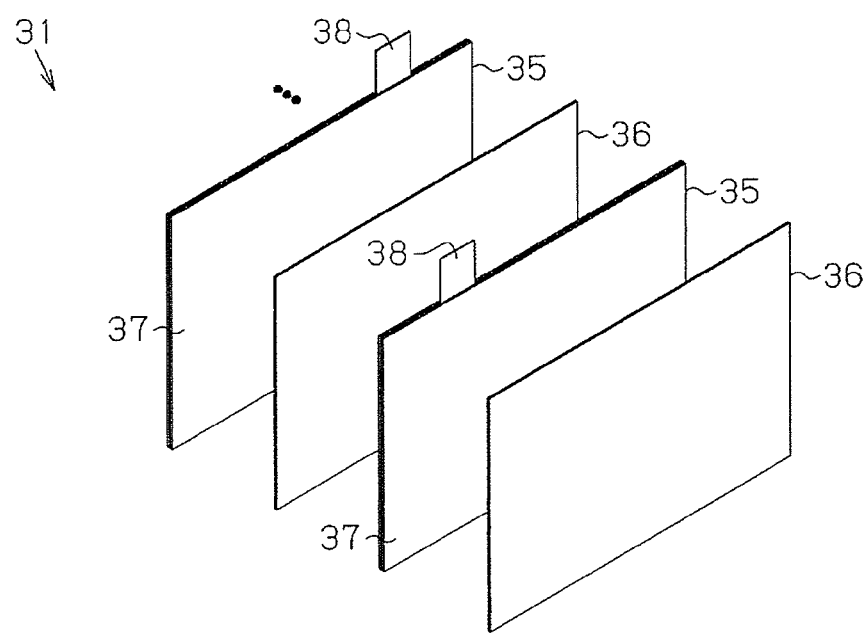
FIG. 5 is an exploded perspective view showing an electrode assembly of the battery module of FIG. 1.

As shown in FIG. 5, the electrode assembly 31 includes laminated electrodes 35 and separators 36, which are located between adjacent ones of the electrodes 35 and insulate the adjacent electrodes 35 from each other. One of the adjacent electrodes 35 is a positive electrode, and the other is a negative electrode. Each electrode 35 includes a rectangular electrode main body 37 and a tab 38. The electrode main body 37 is formed by applying an active material to metal foil, and the tab 38 projects from one end of the metal foil.

Figure 6:
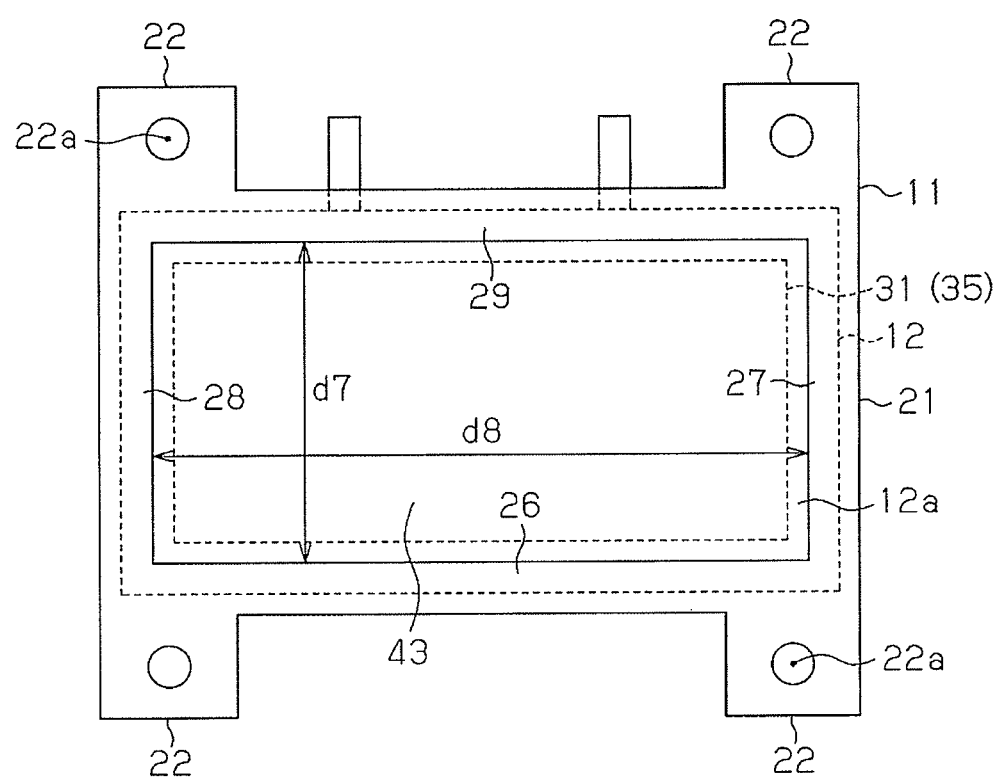
FIG. 6 is a front view of the battery holder showing the relationship between an opening and electrodes.

As shown in FIG. 6, the opening 43 has a dimension d7 in the transverse direction, which is slightly greater than the dimension of the electrode main body 37 of the electrode 35 in the transverse direction, and a dimension d8 in the longitudinal direction, which is slightly greater than the dimension of the electrode main body 37 in the longitudinal direction. Thus, when a plate member 13 is placed in the opening 43, the entirety of a surface of the electrode main body 37 (entirety of the surface that intersects the lamination direction of the electrodes 35) faces toward the plate member 13, with the case main body 33 of the case 32 located between the electrode main body 37 and the plate member 13. In other words, as viewed in the arrangement direction of the rectangular batteries 12, the entirety of a surface of the electrode main body 37 overlaps with the plate member 13 and the opening 43.

As shown in FIGS. 3A and 3B, each rectangular battery 12 includes a first surface 12a and a second surface 12b on the opposite sides in the thickness direction of the rectangular battery 12. When the accommodation section S1 of a battery holder 11 accommodates a rectangular battery 12, the four edges of the first surface 12a of the rectangular battery 12 are in contact with the inner surfaces of the walls 26, 27, 28 and 29 (only two edges of the rectangular battery 12 and two walls 27 and 28 are shown in FIG. 2). In addition, the battery holder 11 is positioned such that the opening 43 opens in the arrangement direction of the rectangular batteries 12.

Each plate member 13 includes a first surface 13a and a second surface 13b on the opposite sides in the thickness direction of the plate member 13. The plate member 13 is thicker than the walls 26, 27, 28 and 29. Thus, when the plate member 13 is placed in the opening 43, the plate member 13 is not entirely received in the opening 43, and part of the plate member 13 protrudes from the battery holder 11. In the present embodiment, the thickness of the entire plate member 13, which is a flat plate, is greater than the thickness of the walls 26, 27, 28 and 29. Thus, the entire first surface 13a of the plate member 13 protrudes from the battery holder 11. The accommodation section S1 and the rectangular battery 12 are substantially equal in dimensions, and the first surface 12a of the rectangular battery 12 is in contact with the inner surfaces of the walls 26, 27, 28 and 29, which define the opening 43. This prevents the plate member 13 from protruding into the accommodation section S1.

Referring to FIG. 2, for the sake of convenience in explanation, an arbitrary one of the arranged rectangular batteries 12 is referred to as a first rectangular battery 12C, and the rectangular battery 12 adjacent to the first rectangular battery 12C is referred to as a second rectangular battery 12D. In addition, the battery holder 11 that holds the first rectangular battery 12C is referred to as a first battery holder 11C, and the battery holder 11 that holds the second rectangular battery 12D is referred to as a second battery holder 11D.

The first surface 13a of the plate member 13 that protrudes from the first battery holder 11C is in contact with the second surface 12b of the second rectangular battery 12D that is held by the second battery holder 11D. The contact between the first surface 13a of the plate member 13 and the second rectangular battery 12D limits movement in the arrangement direction of the rectangular batteries 12. The first surface 13a of the plate member 13 located between the end plate 14 and a rectangular battery 12 is in contact with the end plate 14.

A clearances K is created between adjacent ones of the battery holders 11. Each clearance K corresponds to the part of the associated plate member 13 that protrudes from the battery holder 11. The battery holder 11 is movable within the clearance K in the arrangement direction of the battery holders 11. Although the clearances K are actually minute, the clearances K are shown enlarged in the drawings for illustration purposes.

The rectangular batteries 12, which are accommodated and held in the accommodation sections S1 of the battery holders 11, and the plate members 13 are arranged alternately. The bolts B and the nuts N are tightened with the end plates 14 and 15 located at the opposite ends of the array of the arranged rectangular batteries 12 and the plate members 13. Accordingly, the end plates 14 and 15 sandwich and apply pressure to the rectangular batteries 12 and the plate members 13 in the arrangement direction of the rectangular batteries 12 and the plate members 13. Thus, in the battery module 10, the bolts B and the nuts N maintain the pressure applied by the end plates 14 and 15. In other words, the bolts B, the nuts N, and the end plates 14 and 15 function as pressure application members that apply pressure to the rectangular batteries 12 and the plate members 13.

Operation of the battery module 10 of the present embodiment will now be described.

In the battery module 10, the end plates 14 and 15 are fixed relative to each other by the bolts B and the nuts N while applying pressure to the rectangular batteries 12. This continuously applies load in the arrangement direction of the rectangular batteries 12. Here, the parts of the battery module 10 that receive the load are the plate members 13 and the parts of the rectangular batteries 12 that are in contact with the plate members 13. During charging of the rectangular batteries 12, the electrodes 35 tend to expand. However, the expansion is restrained by the plate members 13 that apply pressure to the rectangular batteries 12.

In addition, since the plate members 13 protrude from the battery holders 11, the pressure applied to the rectangular batteries 12 does not impose load on the battery holders 11.

The above described embodiment has the following advantages.

(1) Each battery holder 11 includes an opening 43, into which a plate member 13 is fitted. The first surface 13a of the plate member 13 protrudes from the battery holder 11 in the arrangement direction of the rectangular batteries 12. When pressure is applied to the battery module 10 in the arrangement direction of the rectangular batteries 12, the load generated by the pressure is imposed on the plate members 13 and the rectangular batteries 12, which are in contact with the plate members 13. Thus, the battery holders 11 are less likely to receive the load generated by the pressure, which allows the battery holders 11 to resist deformation. In addition, since the plate members 13, which receive pressure, are made of metal and thus resist deformation, the pressure applied to the rectangular batteries 12 is less likely to decrease.

(2) The area of the opening 43 is larger than the area of a surface of the electrode main body 37 (the surface that intersects the lamination direction of the electrodes 35). Thus, when the plate member 13 is placed in the opening 43, the entirety of a surface of the electrode main body 37 (the surface that intersects the lamination direction of the electrodes 35) faces the plate member 13. When the plate members 13 apply pressure to the rectangular batteries 12, the entire electrode main bodies 37 receive the pressure from the plate members 13. This facilitates the application of pressure to the electrodes 35. Thus, during charging of the rectangular batteries 12, for example, expansion of the electrodes 35 is properly restrained by the pressure applied by the plate members 13. This limits increases in the distances between the electrodes 35 and deformation of the electrodes 35 that would be resulted from expansion of the electrodes 35. Accordingly, increase in the resistance of the rectangular batteries 12 and increase in Joule loss are limited.

(3) The plate members 13 apply pressure to the rectangular batteries 12 (the cases 32) using the whole first surfaces 13a. The use of surfaces in the application of pressure to the rectangular batteries 12 restrains the rectangular batteries 12 from partially receiving pressure. This allows for uniform application of pressure to the electrode main bodies 37.

The present embodiment may be modified as follows.

In the above illustrated embodiment, the openings 43 are larger than the surfaces of the electrode main bodies 37 that intersect the lamination direction of the electrodes 35 and located at the positions corresponding to the electrodes 35 of the rectangular batteries 12. However, the present invention is not limited to such a structure. The area of the openings 43 may be equal to or slightly smaller than the area of the surfaces of the electrode main bodies 37 that intersect the lamination direction of the electrodes 35. In other words, as long as the plate members 13 apply pressure to the electrodes 35 in a suitable manner, the openings 43 may be smaller than the surfaces of the electrode main bodies 37 that intersect the lamination direction of the electrodes 35.

In the above illustrated embodiment, the thickness of the whole plate member 13 is greater than the thickness of the walls 26, 27 and 28 so that the whole first surface 13a of the plate member 13 in the thickness direction protrudes from the battery holder 11 in the arrangement direction of the rectangular batteries 12. However, the plate member 13 may be partially thicker than the walls 26, 27 and 28 so that a part of the first surface 13a of the plate member 13 in the thickness direction protrudes from the battery holder 11.

The plate member 13 may have a circular shape or a polygonal shape, such as a triangular or tetragonal shape.

Instead of using the bolts B and the nuts N, the rectangular batteries 12 and the plate members 13 may be arranged alternately and accommodated in a housing. In this case, the side walls of the housing that face the end plates 14 and 15 apply pressure to the rectangular batteries 12 and the plate members 13, and the housing functions as a pressure application member. Alternatively, instead of using the bolts B and nuts N, a band may be used that extends between the end plates 14 and 15 and applies pressure.

The electrode assembly (electrodes) of the rectangular battery 12 may be of spiral-wound construction. More specifically, a rectangular battery 12 may be used in which the case 32 accommodates a spiral-wound electrode assembly, which is formed by winding laminated positive electrodes, negative electrodes, and separators. In this case, the opening 43 (plate member 13) may be larger than the part of the largest surface (surface in the thickness direction) of the rectangular battery 12 that corresponds to the spiral-wound electrodes.

The plate members 13 may be made of any metal.

What is claimed is:

1. A battery module comprising:
    a plurality of battery holders, each of which includes an accommodation section;
    a plurality of rechargeable batteries that are each accommodated in respective accommodation sections and arranged side by side;
    a metal plate member located at least between ones of the rechargeable batteries that are adjacent to each other in an arrangement direction; and
    a pressure application member that applies pressure to the rechargeable batteries and the plate member in the arrangement direction of the rechargeable batteries, wherein
    each battery holder includes a plate holding section having an opening into which the plate member is fitted,
    at least a part of the plate member is thicker than the plate holding section in the arrangement direction of the rechargeable batteries,
    the plate member is arranged in the opening of the plate holding section without overlapping with the battery holder such that the plate member protrudes from an associated one of the battery holders to contact an adjacent rechargeable battery in the arrangement direction of the rechargeable batteries.

2. The battery module according to claim 1, wherein
    each rechargeable battery includes an electrode, and
    the opening is located at a position corresponding to the electrode.

3. The battery module according to claim 2, wherein the electrode includes an electrode main body, the entirety of which overlaps with the opening as viewed in the arrangement direction of the rechargeable batteries.

4. The battery module according to claim 2, wherein the electrode includes an electrode main body, the entirety of which overlaps with the plate member as viewed in the arrangement direction of the rechargeable batteries.

5. The battery module according to claim 3, wherein the entirety of the electrode main body also overlaps with the plate member as viewed in the arrangement direction of the rechargeable batteries.

6. The battery module according to claim 1, wherein
    each rechargeable battery includes a first surface and a second surface on an opposite side of the rechargeable battery in the arrangement direction,
    each metal plate member includes a first surface and a second surface on an opposite side of the metal plate member in the arrangement direction, and
    the first surface of the metal plate member contacts the second surface of the rechargeable battery adjacent the metal plate member in the arrangement direction.

* * * * *